(12) United States Patent
Sul et al.

(10) Patent No.: US 10,258,063 B2
(45) Date of Patent: Apr. 16, 2019

(54) METHOD AND DEVICE FOR MULTI-SERVING CAPACITY ICE CREAM BAR MAKING

(71) Applicants: Dong Hwan Sul, Hawaiian Gardens, CA (US); Dabin Sul, South Pasadena, CA (US)

(72) Inventors: Dong Hwan Sul, Hawaiian Gardens, CA (US); Dabin Sul, South Pasadena, CA (US)

(*) Notice: Subject to any disclaimer, the term of this patent is extended or adjusted under 35 U.S.C. 154(b) by 512 days.

(21) Appl. No.: 14/922,148

(22) Filed: Oct. 24, 2015

(65) Prior Publication Data
US 2016/0330997 A1    Nov. 17, 2016

Related U.S. Application Data

(63) Continuation-in-part of application No. 14/710,584, filed on May 12, 2015.

(51) Int. Cl.
| | |
|---|---|
| *A23G 9/26* | (2006.01) |
| *A23G 9/10* | (2006.01) |
| *A23G 9/22* | (2006.01) |
| *A23G 9/08* | (2006.01) |

(52) U.S. Cl.
CPC .............. *A23G 9/221* (2013.01); *A23G 9/083* (2013.01); *A23G 9/225* (2013.01); *A23G 9/228* (2013.01); *A23G 9/26* (2013.01); *A23G 9/10* (2013.01)

(58) Field of Classification Search
CPC .......... A23G 9/083; A23G 9/10; A23G 9/221; A23G 9/26; F25C 1/08; F25C 1/24; F25C 1/04

USPC ......... 99/348, 453, 455; 62/356, 345, 457.1; 425/448, 449; 249/81, 120, 137; 426/317, 389, 515, 519, 524, 565
See application file for complete search history.

(56) References Cited

U.S. PATENT DOCUMENTS

| | | | | |
|---|---|---|---|---|
| 1,955,817 A | * | 4/1934 | Marchiony | A23G 9/221 249/52 |
| 2,282,544 A | * | 5/1942 | Rosberg | A23L 3/364 62/341 |
| 2,498,645 A | * | 2/1950 | Bobby | A23G 9/083 62/356 |
| 4,699,583 A | * | 10/1987 | Grigoli | A23G 9/26 198/465.2 |

(Continued)

FOREIGN PATENT DOCUMENTS

| | | |
|---|---|---|
| GB | 2245474 | 1/1992 |
| JP | 2002176925 | 6/2002 |

(Continued)

*Primary Examiner* — Reginald Alexander
(74) *Attorney, Agent, or Firm* — Chanmin Park

(57) ABSTRACT

A device for multi-serving capacity ice cream bar includes ice cream bar molds 12, a canister that receives the ice cream bar molds, a freezing fluid medium filled in the canister, an agitating device that agitates the freezing fluid medium by rotating the canister cover, a mold monitoring device that monitors freezing status of each mold, and a bar mold status display. A method of making a plurality of ice cream bars comprises steps of filling ingredients into a plurality of ice cream bar molds, placing the ice cream bar molds in a canister cover of a canister, in which freezing fluid medium is filled, and agitating the freezing medium by rotating the canister cover.

12 Claims, 5 Drawing Sheets

(56) References Cited

U.S. PATENT DOCUMENTS

| | | | | |
|---|---|---|---|---|
| 6,109,056 | A | * | 8/2000 | Feldpausch ............ A23G 9/083 62/356 |
| 6,301,919 | B1 | * | 10/2001 | Blaustein ................. A23G 9/22 249/120 |
| 7,426,838 | B1 | | 9/2008 | Shapiro et al. |
| 2006/0277936 | A1 | * | 12/2006 | Norden .................... A23G 9/22 62/340 |
| 2009/0191318 | A1 | | 7/2009 | Cocchi et al. |

FOREIGN PATENT DOCUMENTS

| | | |
|---|---|---|
| JP | 2004313182 | 11/2004 |
| KR | 20-0389103 U | 7/2005 |
| KR | 10-1435132 | 8/2014 |

\* cited by examiner

METHOD AND DEVICE FOR MULTI-SERVING CAPACITY ICE CREAM BAR MAKING

REFERENCE TO RELATED APPLICATION

This application is a continuation-in-part application based on patent application Ser. No. 14/710,584 file by the inventor on May 12, 2015, the disclosures of which are incorporated by reference as if they are fully set forth herein.

FIELD OF THE INVENTION

The present invention is related to a method and a device for ice cream bar making. More specifically, the present invention is related to a method and a device for making ice cream bar having multiple-serving capacity for commercial facilities.

BACKGROUND OF THE INVENTION

Demands for on-site ice cream with natural ingredients are ever increasing. On-site preparation of ice cream must be done in a reasonably short time so that a customer would not be bored and would not lose interest in watching the ice cream preparation process starting from ingredient in front of the customer. An on-site ice cream maker also needs to minimize labor of a store clerk so that she would not be exhausted. Design of a commercial ice cream bar maker achieving fast preparation and minimizing human labor is a difficult task involving many complex factors.

None of the prior arts provide an labor-efficient and fast-preparing ice cream bar maker with compact and simple structure aesthetically appealing to customers in an ice cream shop setting.

BRIEF SUMMARY OF THE INVENTION

An objective of the invention is to provide a method and a device for multi-serving capacity ice cream bar making that enable making multiple ice cream bars in considerably short time.

Another objective of the present invention is to provide a method and a device for multi-serving capacity ice cream bar making that can minimize manual labor of a store clerk who operates the ice cream bar maker.

In order to achieve the objectives, the present invention provides a device for multi-serving capacity ice cream bar making, which comprises a plurality of ice cream bar molds; a canister that receives the ice cream bar molds, wherein the canister comprises a hollow main body with a top opening and a canister cover that covers the top opening, wherein the canister cover comprises a plurality of holes into which the ice cream bar molds are inserted; a freezing fluid medium filled in the canister; a freezing device that removes heat from the canister; wherein the freezing fluid medium contacts the ice cream bar molds whereby removing heat from the ice cream bar molds; an agitating device that agitates the freezing fluid medium; and a freezing controller that controls heat removal rate from the fluid medium.

The agitating device comprises a rotating device that rotates the canister cover.

The freezing controller controls temperature of the freezing medium and rotation speed of the canister cover. The freezing device comprises an evaporator coil, an expansion valve, a condenser and a compressor. The evaporator coil is installed inside the canister and removes heat from the freezing fluid medium.

The device further comprises a mold monitoring device that monitors freezing status of each mold.

The ice cream bar mold comprises an elongated cylindrical mold body. The mold body comprises a top open end, and a bottom closed end. The mold monitoring device measures the temperature of the mold body for each ice cream bar mold.

The ice cream bar mold further comprises a mold identity indicator near the top open end of the mold body. The mold monitoring device recognizes the mold identity indicator of each ice cream bar mold.

The device further comprises a bar mold status display. The mold monitoring device sends data for the recognized mold identities and the measured temperature of the ice cream bar molds to the bar mold status display. The bar mold status display displays the mold identity and temperature of each of the ice cream bar molds.

The canister cover further comprises ice cream bar mold receptacles that receive and hold the ice cream bar molds. Each of the ice cream bar mold receptacles comprises a plurality of heat transfer fins. The heat transfer fins are arranged near the top open end of the ice cream bar mold.

The device further comprises an ingredient pre-cooling chamber in which the ice cream bar molds are temporarily stored before refrigeration in the canister. Inside of the ingredient pre-cooling chamber is kept at predetermined temperature.

The device further comprises an ice cream bar serving chamber in which the ice cream bar molds are temporarily stored after refrigeration in the canister. Inside of the ice cream bar serving chamber is kept at predetermined temperature. The ice cream bar serving chamber comprises an ice cream bar mold heater that heats the mold body of the ice cream bar mold.

The present invention also provides a method of making a plurality of ice cream bars comprising steps of filling ingredients into a plurality of ice cream bar molds; placing the ice cream bar molds in a canister, wherein the canister comprises a hollow main body with a top opening and a canister cover that covers the top opening, wherein the canister cover comprises a plurality of holes into which the ice cream bar molds are inserted, wherein a freezing fluid medium is filled in the canister; and agitating the freezing medium. A freezing device removes heat from the canister, and a freezing controller controls heat removal rate from the fluid medium.

The step of agitating the freezing medium comprises rotating the canister cover with the ice cream bar molds inserted into the holes of the canister cover.

The temperature of the freezing medium and rotation speed of the canister cover are controlled by a freezing controller.

During the step of agitating the freezing medium, freezing status of the ingredient in the ice cream bar mold is monitored by a mold monitoring device.

The method further comprises a step of pre-cooling ingredient, in which the ice cream bar molds are temporarily stored in an ingredient pre-cooling chamber, after the step of filling ingredients and before the step of placing the ice cream bar molds. The inside of the ingredient pre-cooling chamber is kept at predetermined temperature.

The method further comprises a step of serving ice cream bar, in which the ice cream bar molds are removed from the canister, and are temporarily stored in an ice cream bar serving chamber wherein inside of the ice cream, bar serving chamber is kept at predetermined temperature. The ice cream bar serving chamber comprises an ice cream bar mold heater that heats the mold body of the ice cream bar mold, after the step of agitating. The method further comprises step of checking freezing status of ingredients in the ice cream bar molds by referring to an order status display that shows order identity and freezing status of the order, after the step of agitating freezing medium and before the step of serving ice cream bar.

The advantageous effects of the present invention are: (1) the ice cream bar maker can accommodate multiple orders due to multiple number of molds, (2) ingredients in the molds are frozen fast due to rapid heat transfer by the agitation of freezing medium, (3) agitation is accomplished by simple and durable mechanism, (4) freezing status of each ice cream bar mold is separately monitored, (5) the whole process from ingredient preparation to serving of ice cream bar to customer is streamlined.

BRIEF DESCRIPTION OF THE DRAWINGS

The invention will be more fully understood by reference to the detailed description in conjunction with the following FIGS., wherein.

DETAILED DESCRIPTION OF THE INVENTION

Figure 1:
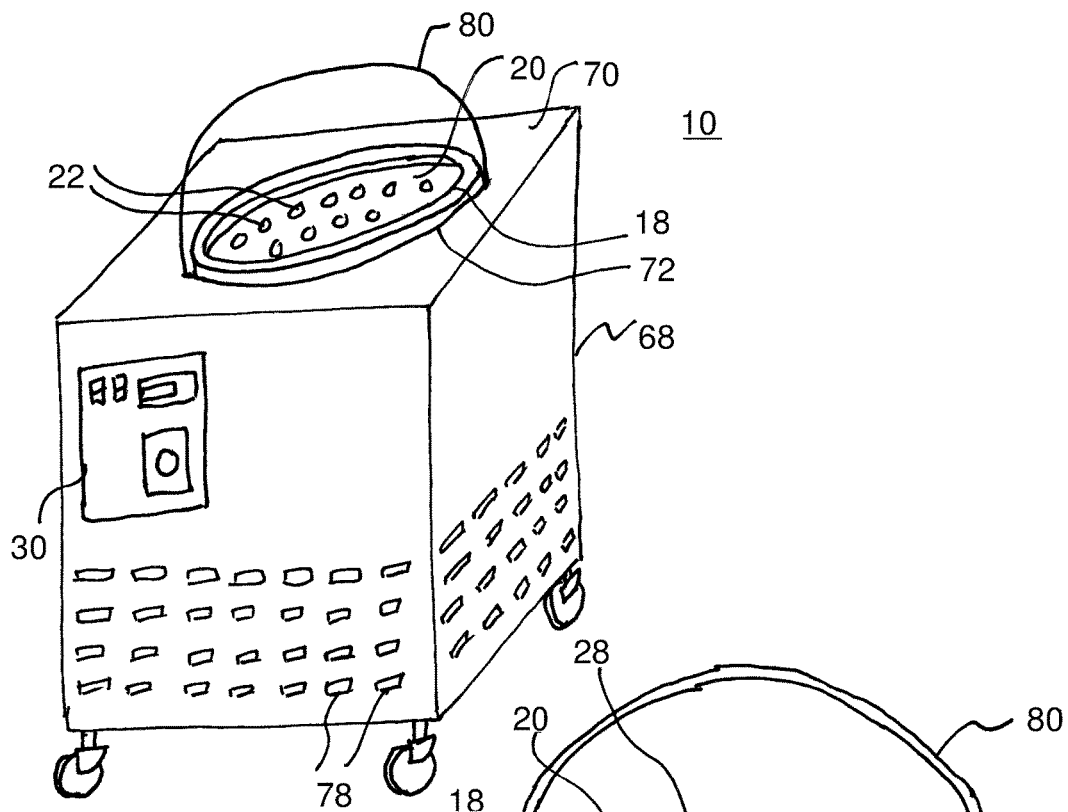
FIG. 1 is a perspective view of a device for multi-serving capacity ice cream bar according to the present invention.
Figure 2:
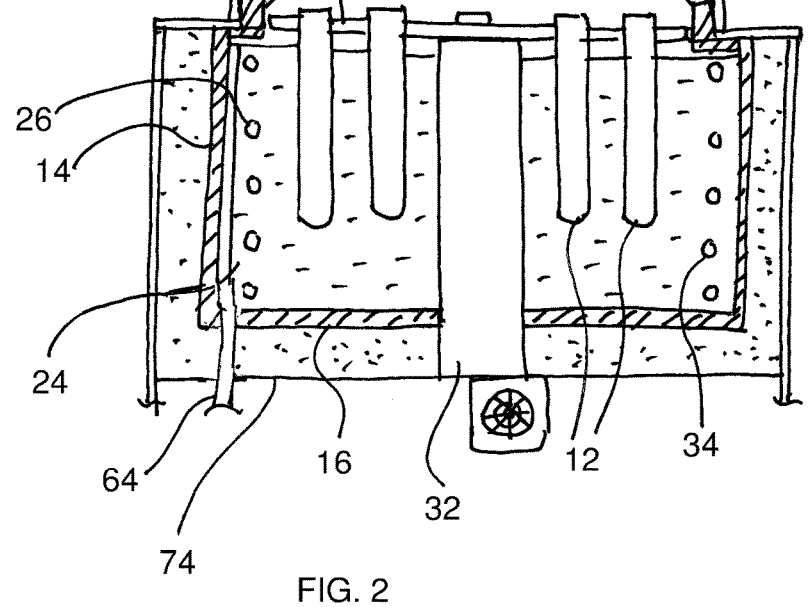
FIG. 2 is a partial cross-sectional view of the device showing a canister.

As shown in FIGS. 1 and 2, the present invention provides a device 10 for multi-serving capacity ice cream bar making, which comprises a plurality of ice cream bar molds 12, a canister 14 that receives the ice cream bar molds 12, wherein the canister 12 comprises a hollow main body 16 with a top opening 18 and a canister cover 20 that covers the top opening 18, wherein the canister cover 20 comprises a plurality of holes 22 into which the ice cream bar molds 12 are inserted, a freezing fluid medium 24 filled in the canister 14, a freezing device 26 that removes heat from the canister 14, an agitating device 28 that agitates the freezing fluid medium 24 and a freezing controller 30 that controls heat removal rate from the fluid medium 24. The freezing fluid medium 24 contacts the ice cream bar molds 12 whereby removing heat from the ice cream bar molds 12. The freezing fluid medium 24 is made of fluid that has a freezing point lower than the freezing point of water. In this embodiment, Calcium Chloride solution is used as the freezing fluid medium 24.

Figure 3:
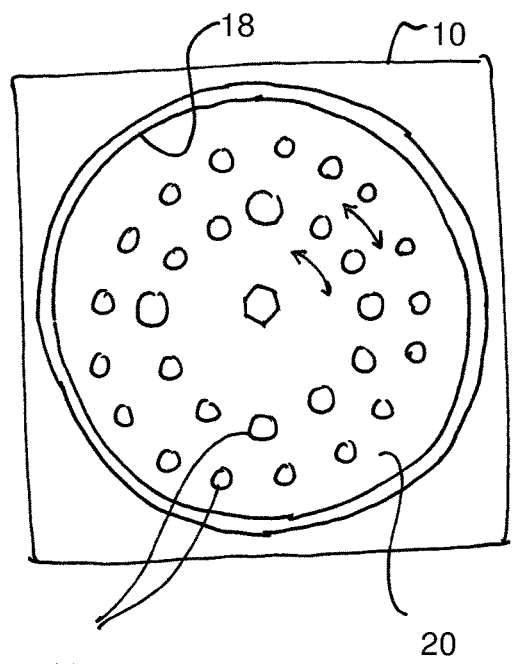
FIG. 3 is a plan view of the device.
Figure 4:
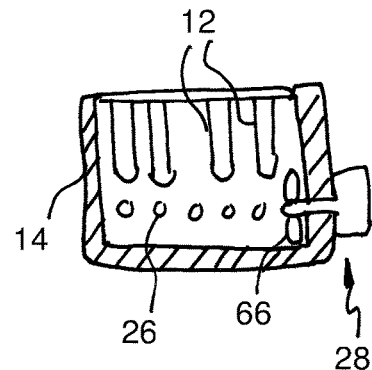
FIG. 4 is a cross-sectional view of a canister showing another agitating device.

The agitating device 28 comprises a rotating device 32 that rotates the canister cover 20. The ice cream bar molds 12, which are inserted into the holes 22 of the canister 14, are partially immersed in the freezing medium 24. As shown by double headed arrows on FIG. 3, when the rotating device 32 rotates the canister cover 20, the ice cream bar molds 12 are moved along concentric circles in the freezing medium 24 thereby agitating the freezing medium 24. The rotation of the canister cover 20 together with the ice cream bar molds 14 inserted also provide aesthetic and entertaining effect to the customers. As shown on FIG. 2, because the canister cover 20 is positioned above the surface of the freezing medium 24, the mechanism 32 for rotating the canister cover 20 is not exposed to the freezing medium 24. Therefore, there is no sealing problem or corrosion problem of the rotating mechanism. The fluid level of the freezing medium 24 is kept constant by an overflow path 64 in the canister 14. Alternatively, as shown on FIG. 4, the agitating device 28 comprises a screw 66 that generates fluid flow inside the canister 14.

Figure 5:
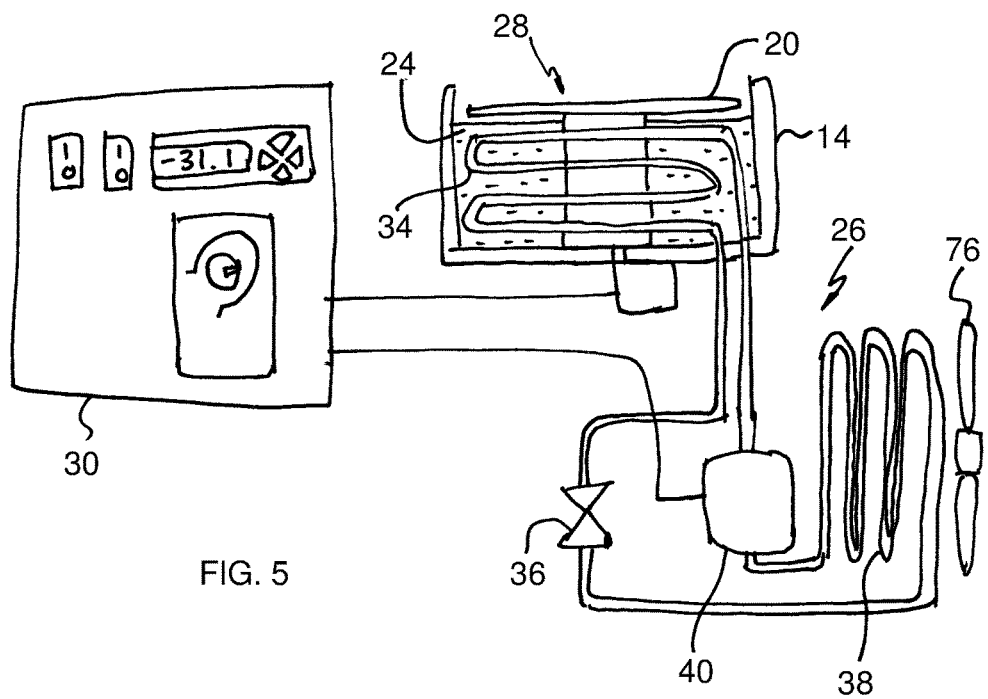
FIG. 5 is a schematic diagram showing a freezing controller.

As shown on FIG. 5, the freezing controller 30 controls temperature of the freezing fluid medium 24 and rotation speed of the canister cover 20. The temperature of the freezing fluid medium 24 is adjusted by controlling the operation of the freezing device 26. The rotation speed of the canister cover 20 is adjusted by stopping, starting and controlling speed of the rotating device 32. The freezing device 26 comprises an evaporator coil 34, an expansion valve 36, a condenser 38 and a compressor 40. The evaporator coil 34 is installed inside the canister 14 and removes heat from the freezing fluid medium 24. As explained above, the freezing fluid medium 24 is agitated by the agitating device 28, thereby inducing flow around the evaporator coil 34. Agitation of the freezing fluid medium 24 maximizes heat transfer from the ice cream bar molds 12, thereby enabling fast serving of multiple number of ice cream bars.

Figure 6:
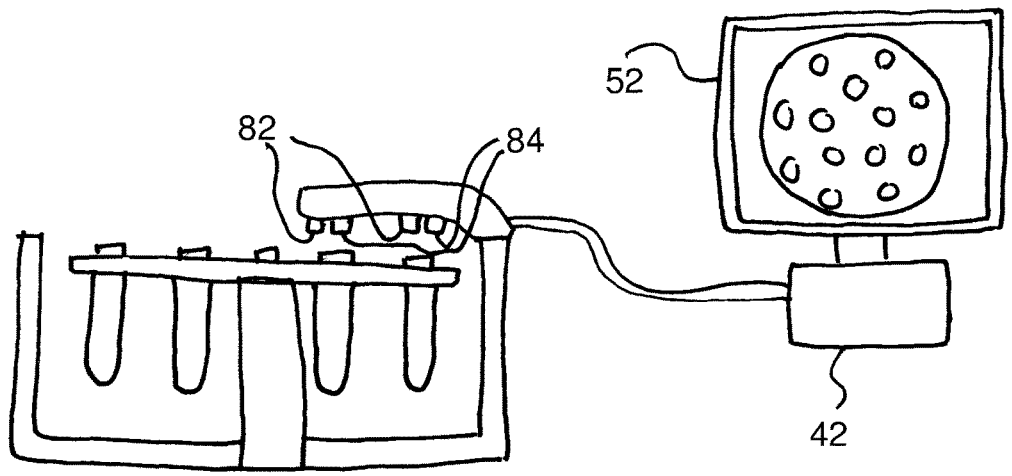
FIG. 6 is a schematic diagram showing a mold monitoring device.

As shown on FIG. 6, the device 10 further comprises a mold monitoring device 42 that monitors freezing status of each mold 12.

Figures 7, 8:
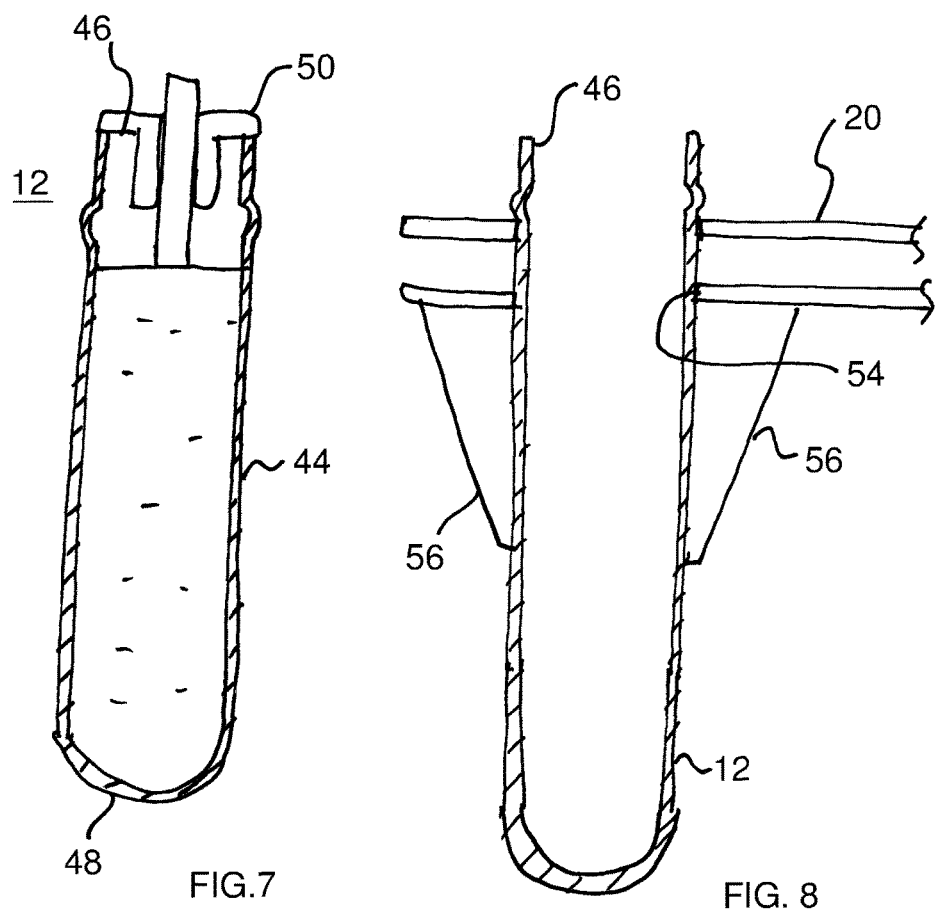
FIG. 7 is a cross-sectional view of an ice cream bar mold.
FIG. 8 is a partial cross-sectional view of a canister cover.

As shown on FIG. 7, the ice cream bar mold 12 comprises an elongated cylindrical mold body 44. The mold body 44 comprises a top open end 46, and a bottom closed end 48. The ice cream bar mold 12 is made of stainless steel, or other material having good heat conductivity. The mold monitoring device 42 comprises one or more non-contact temperature sensor 82, which measures the temperature of the mold body 44 for each ice cream bar mold 12 by non-contact, temperature measurement.

The ice cream bar mold 12 further comprises a mold identity indicator 50 near the top open end 46 of the mold body 44. The mold monitoring device 42 comprises one or more code scanners 84, which recognize the mold identity indicator 50 of each ice cream bar mold 12. The mold body indicator 50 includes a color code and/or a bar code. The ice cream bar mold 12 has a diameter D within a range from about 1.0 inch to about 1.2 inch.

Referring back to FIG. 6, the device 10 further comprises a bar mold status display 52. The mold monitoring device 42 sends data for the recognized mold identities and the measured temperature of the ice cream bar molds 12 to the bar mold status display 52. The bar mold status display 52 displays the mold identity and temperature of each of the ice cream bar molds 12. While the ice cream bar molds 12 are rotated, the bar mold status display 52 displays the status of each of the ice cream bar molds 12 in fixed positions.

As shown of FIG. 8, the canister cover 20 further comprises ice cream bar mold receptacles 54 that receive and hold the ice cream bar molds 12. Each of the ice cream bar mold receptacles 54 comprises a plurality of heat transfer fins 56. The heat transfer fins 56 are arranged near the top open end 46 of the ice cream bar mold 12.

Figure 9:
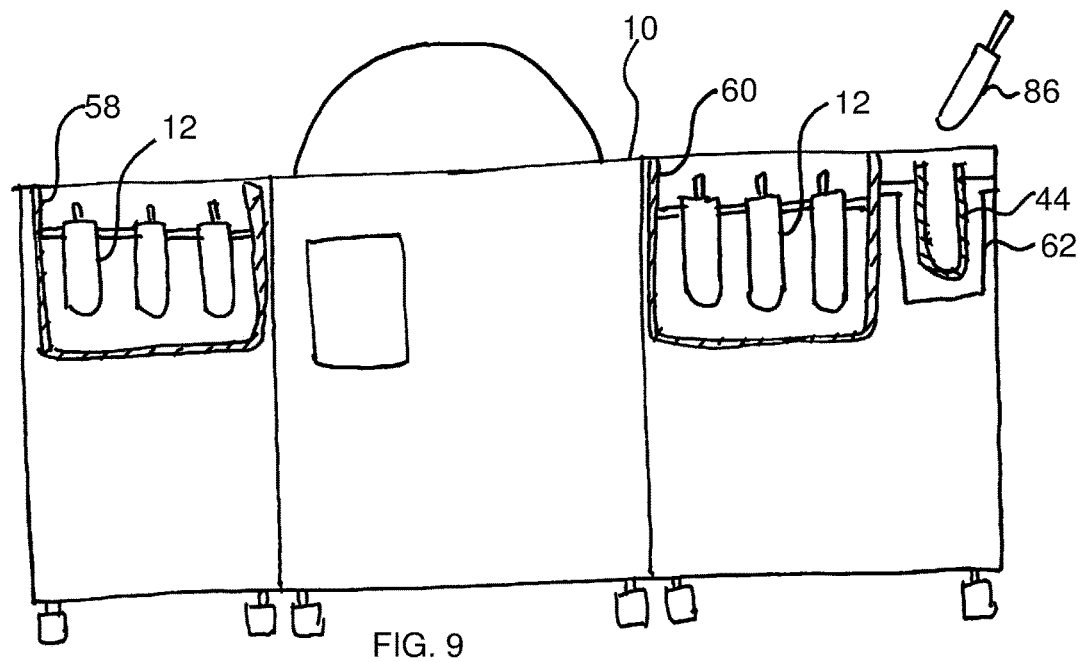
FIG. 9 is a cross-sectional view showing an ingredient cooling chamber and an ice cream bar serving chamber.

As shown on FIG. 9, the device 10 further comprises an ingredient pre-cooling chamber 58 in which the ice cream bar molds 12 are temporarily stored before refrigeration in the canister 14. Inside of the ingredient pre-cooling chamber 58 is kept at predetermined temperature. The temperature is determined to preserve the ingredients just above the freezing point of the ingredients. With this pre-cooling, the time to freeze the ingredient in the canister 14 can be shortened. Rapid freezing keeps the taste of the ingredients best.

The device 10 further comprises an ice cream bar serving chamber 60 in which the ice cream bar molds 12 are temporarily stored after refrigeration in the canister 14 of the device 10. Inside of the ice cream bar serving chamber 60 is kept at predetermined temperature. Optimum temperature is determined to preserve the taste of the frozen ingredient in the ice cream bar during the period after freezing in the canister and before serving to the customer. The ice cream bar serving chamber 60 comprises an ice cream bar mold heater 62 that heats the mold body 44 of the ice cream bar mold 12. The ice cream bar mold heater 62 temporarily heats the mold body 44 in order to melt the surface of the frozen ice cream bar 86 so that it can be separated from the ice cream bar mold 12. The ice cream bar mold heater 62 may be an electric heater, or room temperature water surrounding the mold body 44. The ingredient pre-cooling chamber 58 and the ice cream bar serving chamber 60 provide buffer when there is need for keeping the ingredient of ice cream bar for some time like a few minutes or a few hours before they are frozen or after they are frozen, enabling the device 10 to accommodate both high volume and low volume of orders for the ice cream bars.

Figure 10:
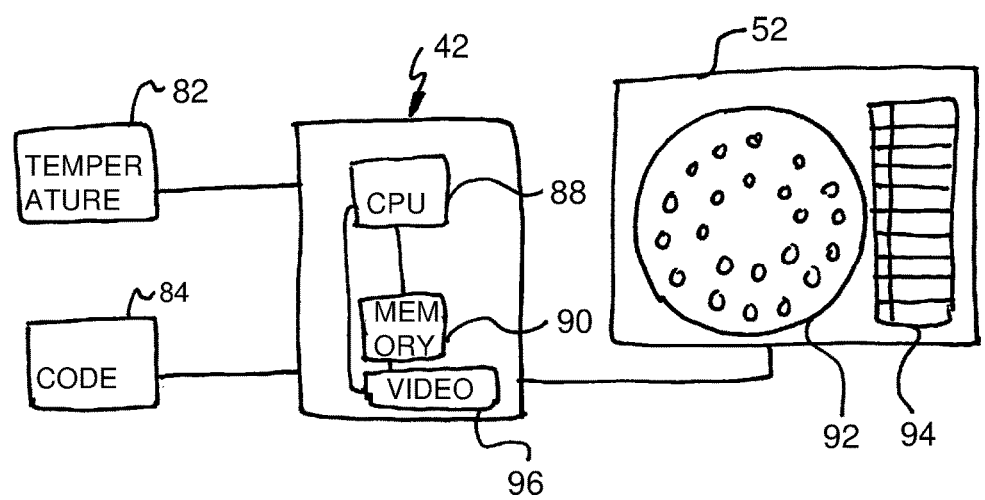
FIG. 10 is a block diagram showing components of the mold monitoring device.

As shown on FIG. 10, the bar mold status display 52 displays a mold position table 92 and an order table 94. The mold position table 92 shows frozen status of ingredients in each ice cream bar mold 12 and its identity, that is, the ingredient and/or the order number. The order table 94 shows the order number, the ingredient, the customer, and frozen status for each ice cream bar mold 12. Because the mold position table 92 shows the positions of the ice cream bar molds 12 statically based on a reference point on the canister cover 20, and the order table 94 shows information for each order including the ingredient, the customer who ordered that particular ice cream bar, the frozen status, which includes remaining time to be ready to be served, the device 10 can be operated without the need of memorizing order details, position of the ice cream bar mold, and remaining time to be completely frozen, etc. The mold monitoring device 42 comprises a CPU 88; and a memory 90 that processes measurement data with the non-contact temperature sensor 82, which is an infrared measurement device, and the code scanner 84; and a video module 96 that generates images to be displayed on the bar mold status display 52.

Figure 11:
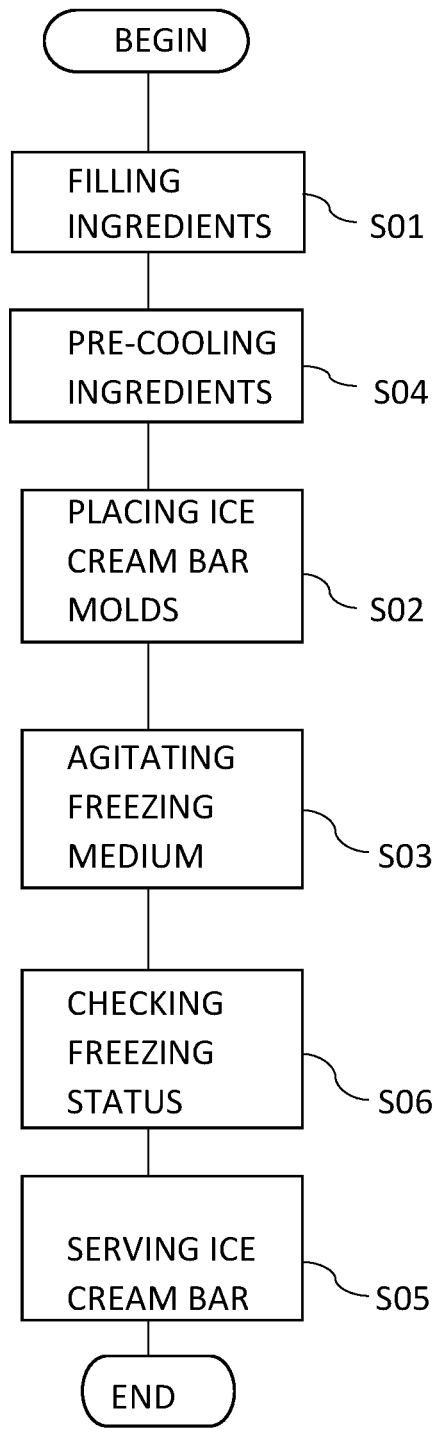
FIG. 11 is a flow diagram showing a method of making a plurality of ice cream bars according to the present invention.

As shown on FIG. 11, the present invention also provides a method of making a plurality of ice cream bars. The method comprises step S01 of filling ingredients into a plurality of ice cream bar molds 12; step S02 of placing the ice cream bar molds 12 in the canister 14; and step S03 of agitating the freezing medium 24.

The step S03 of agitating the freezing medium 24 comprises rotating the canister cover 20 with the ice cream bar molds 12 inserted into the holes 22 of the canister cover 20.

The method further comprises step S04 of pre-cooling ingredient, in which the ice cream bar molds 12 are temporarily stored in the ingredient pre-cooling chamber 58, after step S01 of filling ingredients and before step S02 of placing the ice cream bar molds 12.

The method further comprises step S05 of serving ice cream bar, in which the ice cream bar molds 12 are removed from the canister 14, and are temporarily stored in the ice cream bar serving chamber 60. The ice cream bar serving chamber 60 comprises the ice cream bar mold heater 62 that heats the mold body 44 of the ice cream bar mold 12, after step S03 of agitating. The method further comprises step S06 of checking freezing status of ingredients in the ice cream bar molds 12 by referring to an order status display that shows order identity and freezing status of the order, after step S03 of agitating freezing medium and before step S05 of serving ice cream bar. The order status display includes the mold position table 92 and the order table 94.

Referring back to FIGS. 1 and 2, the device 10 further comprises a case 68 that houses the canister 14 and the freezing device 26. The case 68 comprises a top plate 70 that comprises an opening 72 for receiving the canister cover 20. The device 10 further comprises an insulating container 74 that surrounds the canister 14. Referring back to FIG. 5, a fan 76 moves air out of the case 68 to remove air heated by the condenser 38. Referring back to FIG. 1, the device 10 further comprises vent holes 78 on the four side walls of the case 68, a transparent hemispherical cover 80 that keeps cool air above the canister cover 20.

The above description is illustrative and is not restrictive, and, as it will become apparent to those skilled in the art upon review of the disclosure, the present invention may be embodied in other specific forms without departing from the essential characteristics thereof. The scope of the invention should, therefore, be determined not with reference to the above description, but instead should be determined with reference to the following and pending claims along with their full scope of equivalents.

The invention claimed is:

1. A device for multi-serving capacity ice cream bar making comprising:
   a) a plurality of ice cream bar molds;
   b) a canister that receives the ice cream bar molds, wherein the canister comprises a hollow main body with a top opening and a canister cover that covers the top opening, wherein the canister cover comprises a plurality of holes into which the ice cream bar molds are inserted;
   c) a freezing fluid medium filled in the canister;
   d) a freezing device that removes heat from the canister; wherein the freezing fluid medium contacts the ice cream bar molds whereby removing heat from the ice cream bar molds;
   e) an agitating device that agitates the freezing fluid medium;
   f) a freezing controller that controls heat removal rate from the fluid medium; and
   g) a mold monitoring device that monitors freezing status of each mold;
   wherein the agitating device comprises a rotating device that rotates the canister cover,
   wherein the freezing controller controls temperature of the freezing medium and rotation speed of the canister cover, wherein the freezing device comprises an evaporator coil, an expansion valve, a condenser and a compressor, wherein the evaporator coil is installed inside the canister and removes heat from the freezing fluid medium, wherein the ice cream bar mold comprises an elongated cylindrical mold body, wherein the mold body comprises a top open end, and a bottom closed end, wherein the mold monitoring device measures the temperature of the mold body for each ice cream bar mold.

wherein the ice cream bar mold comprises an elongated cylindrical mold body, wherein the mold body comprises a top open end, and a bottom closed end, wherein the mold monitoring device measures the temperature of the mold body for each ice cream bar mold.

2. The device of claim 1, wherein the ice cream bar mold further comprises a mold identity indicator near the top open end of the mold body, wherein the mold monitoring device recognizes the mold identity indicator of each ice cream bar mold.

3. The device of claim 2, further comprising a bar mold status display, wherein the mold monitoring device sends data for the recognized mold identities and the measured temperature of the ice cream bar molds to the bar mold status display, wherein the bar mold status display displays the mold identity and temperature of each of the ice cream bar molds.

4. The device of claim 3, wherein the canister cover further comprises ice cream bar mold receptacles that receive and hold the ice cream bar molds, wherein each of the ice cream bar mold receptacles comprises a plurality of heat transfer fins, wherein the heat transfer fins are arranged near the top open end of the ice cream bar mold.

5. The device of claim 3, further comprising an ingredient pre-cooling chamber in which the ice cream bar molds are temporarily stored before refrigeration in the canister, wherein inside of the ingredient pre-cooling chamber is kept at predetermined temperature.

6. The device of claim 3, further comprising an ice cream bar serving chamber in which the ice cream bar molds are temporarily stored after refrigeration in the canister, wherein inside of the ice cream bar serving chamber is kept at predetermined temperature, wherein the ice cream bar serving chamber comprises an ice cream bar mold heater that heats the mold body of the ice cream bar mold.

7. A method of making a plurality of ice cream bars comprising steps of:
 a) filling ingredients into a plurality of ice cream bar molds;
 b) placing the ice cream bar molds in a canister, wherein the canister comprises a hollow main body with a top opening and a canister cover that covers the top opening, wherein the canister cover comprises a plurality of holes into which the ice cream bar molds are inserted, wherein a freezing fluid medium is filled in the canister; and
 c) agitating the freezing medium;
 wherein a freezing device removes heat from the canister, and
 wherein a freezing controller controls heat removal rate from the fluid medium,
 wherein the step of agitating the freezing medium comprises rotating the canister cover with the ice. cream bar molds inserted into the holes of the canister cover,
 wherein the temperature of the freezing medium and rotation speed of the canister cover are controlled by a freezing controller,
 wherein during the step of agitating the freezing medium, freezing status of the ingredient in the ice cream bar mold is monitored by a mold monitoring device,
 wherein the ice cream bar mold comprises an elongated cylindrical mold body, wherein the mold body comprises a top open end, and a bottom closed end, wherein the mold monitoring device measures the temperature of the mold body for each ice cream bar mold.

8. The method of claim 7, wherein the ice cream bar mold further comprises a mold identity indicator near the top open end of the mold body, wherein the mold monitoring device recognizes the mold identity indicator of each ice cream bar mold.

9. The method of claim 8, wherein the mold monitoring device sends data for the recognized mold identities and the measured temperature of the ice cream bar molds to a bar mold status display, wherein the bar mold status display displays the mold identity and temperature of each of the ice cream bar molds.

10. The method of claim 9, wherein the canister cover further comprises ice cream bar mold receptacles that receive and hold the ice cream bar molds, wherein each of the ice cream bar mold receptacles comprises a plurality of heat transfer fins, wherein the heat transfer fins are arranged near the top open end of the ice cream bar mold.

11. The method of claim 9, further comprising a step of pre-cooling ingredient, in which the ice cream bar molds are temporarily stored in an ingredient pre-cooling chamber, after the step of filling ingredients and before the step of placing the ice cream bar molds, wherein inside of the ingredient pre-cooling chamber is kept at predetermined temperature; and a step of serving ice cream bar, in which the ice cream bar molds are removed from the canister, and are temporarily stored in an ice cream bar serving chamber wherein inside of the ice cream bar serving chamber is kept at predetermined temperature, wherein the ice cream bar serving chamber comprises an ice cream bar mold heater that heats the mold body of the ice cream bar mold, after the step of agitating.

12. The method of claim 11, further comprising a step of checking freezing status of ingredients in the ice cream bar molds by referring to an order status display that shows order identity and freezing status of the order, after the step of agitating freezing medium and before the step of serving ice cream bar.

* * * * *